US008290804B2

(12) United States Patent
Gong

(10) Patent No.: US 8,290,804 B2
(45) Date of Patent: Oct. 16, 2012

(54) METHOD AND APPARATUS FOR AUTOMATED TIME BANKING AND WORKFORCE SCHEDULING

(75) Inventor: Guoqiang Gong, Militus, CA (US)

(73) Assignee: Verint Americas Inc., Melville, NY (US)

(*) Notice: Subject to any disclaimer, the term of this patent is extended or adjusted under 35 U.S.C. 154(b) by 163 days.

(21) Appl. No.: 12/852,144

(22) Filed: Aug. 6, 2010

(65) Prior Publication Data
US 2011/0071870 A1 Mar. 24, 2011

Related U.S. Application Data

(60) Provisional application No. 61/231,872, filed on Aug. 6, 2009.

(51) Int. Cl.
G06Q 10/00 (2012.01)
(52) U.S. Cl. ...................................................... 705/7.13
(58) Field of Classification Search .................. 705/7.13
See application file for complete search history.

(56) References Cited

U.S. PATENT DOCUMENTS

| | | | | |
|---|---|---|---|---|
| 4,466,078 A | * | 8/1984 | Treiman | 710/73 |
| 5,325,292 A | * | 6/1994 | Crockett | 705/7.18 |
| 5,497,141 A | * | 3/1996 | Coles et al. | 340/309.7 |
| 5,842,182 A | * | 11/1998 | Bonner et al. | 705/32 |
| 6,401,079 B1 | * | 6/2002 | Kahn et al. | 705/30 |
| 6,574,605 B1 | * | 6/2003 | Sanders et al. | 705/7.26 |
| 6,587,831 B1 | * | 7/2003 | O'Brien | 705/7.16 |
| 6,681,210 B2 | * | 1/2004 | Kelly | 705/32 |
| 7,004,389 B1 | * | 2/2006 | Robinson et al. | 235/382 |
| 7,114,648 B2 | * | 10/2006 | Ginskey et al. | 235/377 |
| 7,222,082 B1 | * | 5/2007 | Adhikari et al. | 705/7.22 |
| 7,233,919 B1 | * | 6/2007 | Braberg et al. | 705/32 |
| 7,325,190 B1 | * | 1/2008 | Boehmer et al. | 715/224 |
| 7,367,491 B2 | * | 5/2008 | Cheng et al. | 235/376 |
| 7,478,051 B2 | * | 1/2009 | Nourbakhsh et al. | 705/7.37 |
| 7,499,869 B2 | * | 3/2009 | Iknoian | 705/7.16 |
| 7,606,773 B2 | * | 10/2009 | Zhu | 706/13 |
| 7,650,293 B2 | * | 1/2010 | Kiran et al. | 705/7.25 |
| 7,672,746 B1 | * | 3/2010 | Hamilton et al. | 700/100 |
| 7,725,339 B1 | * | 5/2010 | Aykin | 705/7.14 |
| 7,840,435 B2 | * | 11/2010 | Robertson et al. | 705/7.16 |
| 8,015,042 B2 | * | 9/2011 | Seetharaman et al. | 705/7.12 |

(Continued)

FOREIGN PATENT DOCUMENTS
EP 1271379 A1 * 1/2003

OTHER PUBLICATIONS

Ten Tips on Strategic Planning in the Contact Center Witness Actionable Solutions, Verint, Sep. 2007.*

(Continued)

*Primary Examiner* — Scott L Jarrett

(57) ABSTRACT

A method for automated time banking is provided. The method includes creating a time bank for an employee within an organization in a memory, and assigning the time bank to the employee. The method also includes determining base hours, vacation hours, and hours worked for the employee, and processing the base hours, vacation hours, and hours worked in a computer to determine time bank hours for the employee. The method further includes storing the time bank hours in the time bank, processing the time bank in the computer to determine a work schedule for the employee, and storing the work schedule in the memory.

11 Claims, 2 Drawing Sheets

U.S. PATENT DOCUMENTS

| | | | | |
|---|---|---|---|---|
| 8,078,486 | B1 * | 12/2011 | McLean et al. | 705/7.14 |
| 8,108,237 | B2 * | 1/2012 | Bourne et al. | 705/7.13 |
| 8,117,064 | B2 * | 2/2012 | Bourne et al. | 705/7.38 |
| 2002/0143599 | A1 * | 10/2002 | Nourbakhsh et al. | 705/9 |
| 2004/0267591 | A1 * | 12/2004 | Hedlund et al. | 705/9 |
| 2005/0004828 | A1 * | 1/2005 | deSilva et al. | 705/9 |
| 2005/0096962 | A1 * | 5/2005 | Narasimhan et al. | 705/9 |
| 2005/0131748 | A1 * | 6/2005 | Parker | 705/8 |
| 2005/0288987 | A1 * | 12/2005 | Sattler et al. | 705/9 |
| 2007/0061183 | A1 * | 3/2007 | Seetharaman et al. | 705/9 |
| 2007/0094109 | A1 * | 4/2007 | Perry | 705/32 |
| 2008/0300955 | A1 | 12/2008 | Hamilton et al. | |
| 2008/0300963 | A1 | 12/2008 | Seetharaman et al. | |
| 2009/0098941 | A1 * | 4/2009 | Kothari | 463/42 |
| 2009/0248552 | A1 * | 10/2009 | Taylor et al. | 705/32 |
| 2010/0063909 | A1 * | 3/2010 | Smith et al. | 705/32 |

OTHER PUBLICATIONS

Impact 360 for Back-office operations Verint, Aug. 2007.*

Impact 360—Strategic Planner Verint, 2010.*

Impact 360—Analytics-driven Workforce Optimization Verint, Witness Actionable Solutions, May 2008.*

Impact 360 Workforce Management Package Powered by Avaya Avaya, Sep. 2008.*

Impact 360—Your single-source workforce optimization solution Witness Systems, Inc., 2007.*

Stockford, Paul, Research Update: Verint Witness Actionable Solutions Brings Back Office Efficiencies to Impact 360 Platform Saddletree Research, Sep. 12, 2007.*

Impact 360—Strategic Planning Witness Systems, Inc, Apr. 2007.*

Impact 360—Workforce Management: Reinvented Witness Systems, Inc., Jan. 2006.*

Impact 360 Success Story: Telecontact Verint, Witness Actionable Solutions, Sep. 2008.*

Flextime and "time banking" schemes Internatinoal Labor Office, Conditions of Work and Employment Program, May 2004.*

NOVAtime 3000 Enterprise Edition—Release 3 NOVAtime, Technology Inc., White Paper, Jul. 2005.*

Kronos Smart Scheduler: Frontline Labor Management Enterprise Information Kronos Inc., 1999.*

Kronos.com Web Pages Kronos, Inc., Apr. 2000, Jan. 2001, Retrieved from Archive.org Jan. 10, 2006.*

PrimeTime F&S Version 1.3—User's Guide Blue Pumpkin Software, Inc., 1998.*

ScheduleSoftt.com Web Pages ScheduleSoft, Mar. 2000, Retrieved from Archive.org Jan. 31, 2006.*

Thompson, Gary M, Labor Scheduling Part 2: Knowing How Many On-duty Employees to Schedule Cornell Hotel and Restaurant Administration Quarterly, vol. 38, No. 6, Dec. 1998.*

Abs-usa.com Web Pages—Visual Staff Scheduler Atlas Business Solutins, Nov. 1999, Retrieved from Archive.org Oct. 11, 2006.*

TotalView—WebStation Guide—Release 3.7 IEX Corporation, Jun. 2004.*

Time banking—definition Wikipedia.org, Retrevied May 22, 2012.*

Kampstra, Peter, Supporting Work Force Management in Customer Contact Centers Jun. 6, 2005.*

Camplbell, Susan J., Verint Enhances Impact 360 Workforce Management Software TMCNet, Mar. 19, 2010.*

* cited by examiner

METHOD AND APPARATUS FOR AUTOMATED TIME BANKING AND WORKFORCE SCHEDULING

RELATED APPLICATIONS

This application hereby claims the benefit of and priority to U.S. Provisional Patent Application No. 61/231,872, titled "AUTOMATED TIME BANKING", filed on Aug. 6, 2009, and which is hereby incorporated by reference in its entirety.

TECHNICAL BACKGROUND

Time banking is a common practice in companies in Europe, particularly in Germany and France, and is becoming more common in the U.K. These companies often have full time salaried employees, but have large seasonal variations in their incoming volume of work. The incoming volume is work such as call volume and emails in a call center, insurance claims in a back office, or the like.

Instead of using over time or part-time employees to meet the variable load, these companies enter into an agreement with their full-time employees to work longer hours during busy times of the year, and fewer hours during slow times of the year. The agreement ensures that throughout the course of the year the employees still end up working the same total number of hours that they would have worked in a normal year with a set number of hours per week. Employees "bank" hours when they work more than the normal amount of time, and withdraw from the "bank" when they work less than the normal number of hours.

OVERVIEW

A method for automated time banking is provided. The method includes creating a time bank for an employee within an organization in a memory, and assigning the time bank to the employee. The method also includes determining base hours, vacation hours, and hours worked for the employee, and processing the base hours, vacation hours, and hours worked in a computer to determine time bank hours for the employee. The method further includes storing the time bank hours in the time bank, processing the time bank in the computer to determine a work schedule for the employee, and storing the work schedule in the memory.

A system for automated time banking is provided. The system includes a memory configured to store a time bank, and a work schedule, and a processor coupled to the memory. The processor is configured to create a time bank for an employee within an organization, and assign the time bank to the employee.

The processor is also configured to determine base hours, vacation hours, and hours worked for the employee, and process the base hours, vacation hours, and hours worked to determine time bank hours for the employee. The processor is further configured to store the time bank hours in the time bank in the memory, process the time bank to determine a work schedule for the employee, and store the work schedule in the memory.

A non-transitory computer-readable medium having instructions stored thereon for operating a computer system is provided. The instructions, when executed by the computer system, direct the computer system to create a time bank for an employee within an organization, store the time bank in a memory, and assign the time bank to the employee.

The instructions further direct the computer system to determine base hours, vacation hours, and hours worked for the employee, process the base hours, vacation hours, and hours worked to determine time bank hours for the employee, and store the time bank hours in the time bank in the memory. The instructions also direct the computer system to process the time bank to determine a work schedule for the employee, and store the work schedule in the memory.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by claims and their equivalents.

In an automated time banking solution, employees are able to accrue time worked over their normal work schedule in a time bank. They are then able to later work less than their normal work schedule by "withdrawing" time worked from their time bank. Further, in some examples, employees are allowed to have a negative balance in their time bank in cases where the employee starts the time bank period working fewer hours than a normal schedule, with the expectation that they will work more hours than the normal schedule later in the time bank period.

Also, the time bank may be used in the automated generation of work schedules for the employee. When various parameters, such as base hours, vacation hours, hours worked, and the like are processed, time bank hours may be determined. These time bank hours may then be used in the automated generation of work schedules such that work schedules are created that strive to reduce the magnitude of the employee's time bank hours.

For example, if an employee has built up a large positive time bank, the automatic scheduler will attempt to give that employee fewer than normal hours during the next work period. If an employee has a large negative time bank the automatic scheduler will attempt to give that employee more than normal hours during the next work period.

Figure 1:
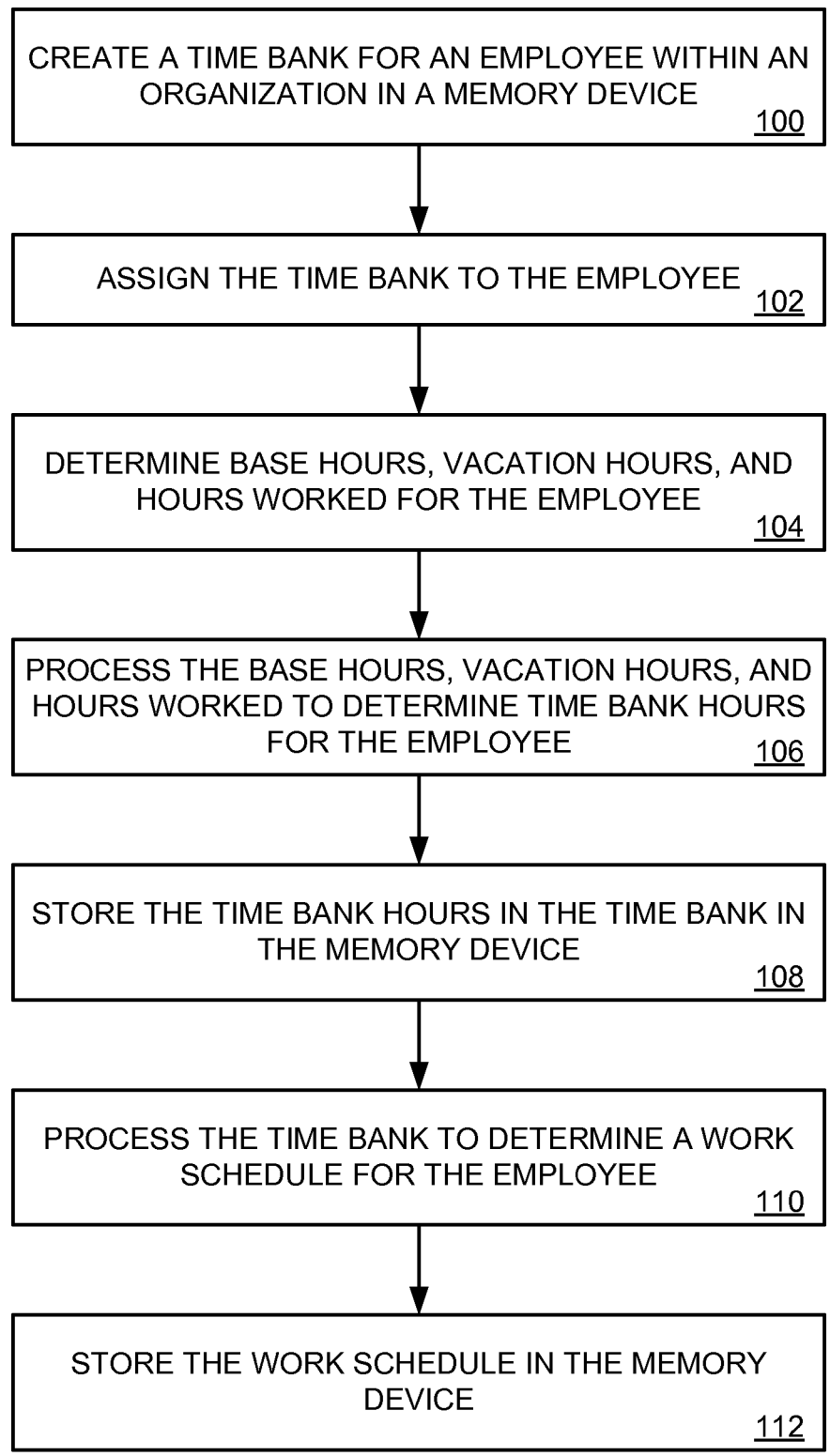
FIG. 1 illustrates a flowchart of a method for automated time banking.

FIG. 1 illustrates a flowchart of a method of automated time banking The method starts by creating a time bank for an employee within an organization in a memory device, (operation 100). The method assigns the time bank to the employee, (operation 102).

The method then determines base hours, vacation hours, and hours worked for the employee, (operation 104). A computer processes the base hours, vacation hours, and hours worked to determine time bank hours for the employee, (operation 106). The computer then stores the time bank hours in the time bank in the memory device, (operation 108).

The computer processes the time bank to determine a work schedule for the employee, (operation 110), and stores the work schedule in the memory device, (operation 112).

In some embodiments a time bank plan for the organization may be created and used to determine goal hours for the organization and for employees within the organization. For example, a time bank plan including hours worked, expected hiring, expected attrition, expected incoming work volume, and the like may be created for an organization. This time bank plan may cover any period of time, such as a year, and include forecasted work volumes for the year.

In one example, a heavier work volume may be expected for the summer, and this is expressed in the time bank plan. When this example time bank plan is processed, the time bank period (or periods) for the summer months will have larger goal hours than the time bank periods for the rest of the year. In response, the automatic scheduler will schedule more employees to work more hours during the summer months and fewer hours during the other months of the year.

In other embodiments, an adjustment to the time bank may be provided. This allows a user to adjust time bank hours for one or more employees within the organization. For example, this may be necessary for a new employee that begins working in the middle of a time bank period, or to allow for training hours for certain employees within a time bank period.

In further embodiments, actual worked hours for the employee are tracked and used to automatically update the time bank based on the actual worked hours. This allows the time bank to be continuously updated for the employee. In still other embodiments, minimum work hours, maximum work hours, overtime hours, and the like may be included in determining the time bank hours, and the work schedule for the employee. These parameters may be manually set for each employee or determined for an entire organization. The automatic work scheduler then takes into account these limits in constructing work schedules for the employees of the organization.

Figure 2:
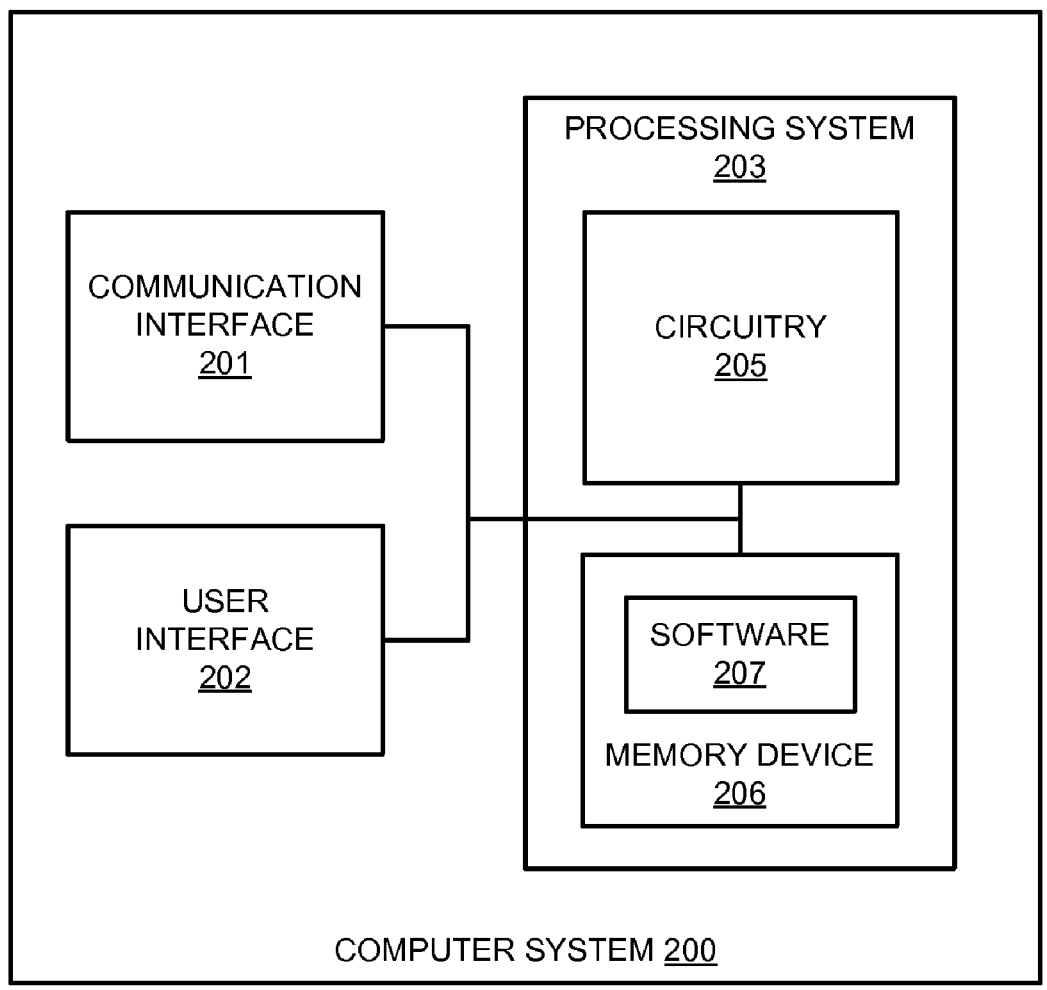
FIG. 2 illustrates a computer system configured for automated time banking.

Disclosed herein is an automated time banking system. The automated time banking system is implemented on computer system 200, as shown in FIG. 2. Computer system 200 includes communication interface 201, user interface 202, and processing system 203. Processing system 203 is linked to communication interface 201 and user interface 202 through bus 208. Processing system 203 includes processing circuitry 205 and memory device 206 that stores operating software 207.

Communication interface 201 includes components that communicate over communication links, such as network cards, ports, RF transceivers, processing circuitry and software, or some other communication devices. Communication interface 201 may be configured to communicate over metallic, wireless, or optical links. Communication interface 201 may be configured to use TDM, IP, Ethernet, optical networking, wireless protocols, communication signaling, or some other communication format—including combinations thereof.

User interface 202 includes components that interact with a user. User interface 202 may include a keyboard, display screen, mouse, touch pad, or some other user input/output apparatus. User interface 202 may be omitted in some examples.

Processing circuitry 205 includes microprocessor and other circuitry that retrieves and executes operating software 207 from memory device 206. Memory device 206 includes a disk drive, flash drive, data storage circuitry, or some other memory apparatus. Operating software 207 includes computer programs, firmware, or some other form of machine-readable processing instructions. Operating software 207 may include an operating system, utilities, drivers, network interfaces, applications, or some other type of software. When executed by circuitry 205, operating software 207 directs processing system 203 to operate computer system 200 as described herein.

In some example embodiments, time banking software provides the following high level work flow:

Creating/Optimizing a Plan—The plan contains a set of weekly target hours over a period of 6 weeks to a year that take into consideration the seasonal variations in incoming volume.

Scheduling to the Plan—Shift assignments are calculated for each employee. The shift assignments adhere to established minimum and maximum weekly hours and meet the incoming volume forecasted in the previous steps plan.

Tracking the Plan—Visual displays of the plan target hours, scheduled hours, and worked hours are displayed to the user through graphical displays and statistical reports. These displays assist the user in evaluating adherence to the original time bank plan.

This software provides all the key elements for successfully planning, scheduling and tracking to a work plan based on a time bank modeled system.

In an example embodiment, the automated time banking system utilizes the following workflow:

1) OPTIMIZE—a work hours plan using a strategic planner over a specified period of time (optional step).

2) CREATE—one or more time banks by importing the plan from the strategic planner or manually editing work hours through a flexible interface.

3) ASSIGN—time banks to individual employees. Make adjustments, when necessary, to work hours for individual cases.

4) SCHEDULE—employees within their campaigns based on the time bank plan.

5) TRACK—employees plan hours, scheduled hours, and worked hours through user displays and reports.

Strategic Planner: A strategic planner application creates an effective long-range plan, such as 6 months, 1 year, 2 years, or more by predicting future conditions, the types of ongoing actions needed to meet those conditions, and the costs and relative effectiveness of the ongoing actions. The objective of a strategic planner is to reduce the expenditure of time and money by an enterprise while maximizing efficiency and profit.

A previous generation strategic planner optimized to provide optimal hiring plans. An upcoming strategic planner version has been extended to integrate time banking functionality by permitting the user to optimize their projected strategic workforce plan over multiple parameters. Optimization can be based on the following parameters:

Hours per week
Vacation hours per week
Overtime hours
Retraining
Layoff plans
Hiring
and the like With these additional parameters a strategic planner may use a heuristic search algorithm to optimize over all of these parameters to reach an optimized plan.

A user first must enter the work rule constraints for the staffing profiles. The parameters are:

Minimum hours per week—the minimum number of hours a profile should work,

Maximum hours per week—the maximum number of hours a profile should work,

Maximum OT hours per week—the maximum number of Over Time hours,

Paid hours per scenario—the exact number of hours a profile should work for the entire scenario, and Paid Vacation Hours per scenario—the exact number of vacation hours a profile should have for the entire scenario, default 160.

The user then creates a forecast of the expected work flow, desired service levels, known information regarding shrinkage, attrition, starting work force levels and known hires. This information needs to be predicted over the entire scenario.

The user is now ready to generate a plan over the period of the scenario that will meet the forecasted needs and fall within the limits of the employee parameters.

The user must set the optimization parameter "Hours per week" or "Hours per month" (this depends on if this is a weekly or monthly scenario), but also should optimize over as many parameters as possible to get the most optimized time bank plan. Once generated the user can view the hours for each individual week/month for each staffing profile, as well as hours in training, number of hires, how many are transferring in or out, expected attrition, vacation hours, overtime hours, and layoffs for each time period.

The final step is to export the staffing weekly/monthly hours data to be available to the forecasting and scheduling software. Exported data will have a unique name that includes the name of the staffing profile and the start and end date of the portion of data being exported. Exported data may be limited to be between 6 weeks and 1 year long, which is the time bank maximum that will be scheduled and tracked.

Forecasting and Scheduling (F&S): Forecasting and scheduling software, F&S, is a comprehensive WFM (work force management) system. It provides an interface for the user to enter parameters such as employees, skill, and work rules. F&S allows schedulers to create campaigns with scheduling periods of 1 to 6 weeks with specific employees assigned, forecasted workloads, and desired service goals. The scheduling algorithm uses all of these inputs to generate a schedule for these employees that both meet their work rules and their incoming volumes and goals.

An upcoming version of F&S has been expanded to include time bank planning. It provides a series of interfaces for assisting the user in entering and scheduling to the time bank plan.

Initializing a Time Bank: Step one is the creation of the time bank. The user can initialize a time bank by selecting to induct the strategic planner staff profile of work hours, by importing a time bank file, by specifying an overall yearly target goal to be distributed, or by copying and pasting an existing time bank. Once initialized the user can edit, lock and reload values, to finalize their time bank plan. The user specifies a unique name, a start and end date, and then decides how to initialize the target hours for our base period level of one week.

Initializing/Updating Time Bank with a Strategic Planner Plan: The user can initialize or update an existing plan by selecting "Use Strategic Planner Plan" and then selecting one of the plans that appears in the drop down list. The list will contain all strategic plans that overlap the time bank's start and end. The importance of this is the user can update specific portions of the time bank plan by exporting from strategic planner specific date ranges, and then loading them into that portion of the time bank. In addition, selected base period target values can be locked, so that when loading planner it will only load data into those base periods that are not locked. This provides for a very powerful flexible update tool.

Initializing/Updating Time Bank with Total Target Hours: The user can initialize or update a time bank plan by entering a single value to be distributed across the base periods of the time bank. On initialization, this value is distributed evenly with a carryover algorithm to limit the weekly values to 15 minute granularity. On update, this value is distributed proportionately based on the existing values. This is powerful if the user determines that the maximum hours an employee can work per year is changed and he doesn't want to adjust everything, the update will be proportionately spread across the year.

Initializing/Updating Time Bank from a File: The user will have similar capabilities as when initializing from strategic planner data. The file will be loaded into the intersecting dates with the time bank date range. The user can lock current base periods to avoid updating all values.

Initializing with Copy/Paste: If a current time bank is similar to one the user would like to create, he can choose to copy/paste to create a new time bank with the same values. The user will have the ability to modify the start and end dates in this scenario. This is powerful when seasonal work flow patterns will be repeated in the following year, a time bank can be fitted to the following year, and then massaged for any known variations. Also, if the user wants the same proportional increase and decrease in work hours on a new time bank, they can, for example, copy and paste a full time bank, and then change the total hours to be the part time maximum. The reduction of hours will be fit proportionately to the original full time hours across the time bank.

Time Bank Display: The time bank is then displayed showing all the individual work hours and the rolled up total number of values. F&S has provided the user with a selection of flexible tools for viewing/modifying their data from the grid display.

Intermediate Periods: There are not only the base periods and total target time bank hours, there are also intermediate periods. These periods are created, optionally, by the user to combine base periods into a single rolled up value. This is useful because it allows the user to visualize/modify workers hours based on intermediate periods that reflect their company's workload periods such as winter, spring, summer fall, or their release cycle. When editing an intermediate period, the hours will be distributed down proportionately to the children base periods. Also, the hours will be rolled up to the target bank hours if it is not locked, or otherwise to the other intermediate periods proportionately.

Locking: The user has the ability to lock individual cells. When locked the data will appear in a grayed cell and the user can not edit the value without first unlocking. This provides powerful editing ability. A locked cell will never be updated no matter if we are loading data as described earlier, but also when modifying other level values that must be rolled up or down. If the user edits a value it will automatically be locked to protect the user entry. Users cannot modify values if all possible combinations for disbursing the changed to the other period levels are blocked because of locked cells.

Assigning Time Banks to Employees: The time bank plans are complete and ready for assignment to individual employees. Employees can have as many time banks assigned to them as needed, but they may not overlap.

Scheduling: The user is now ready to apply the time bank model to his scheduling. He creates a campaign that is between 1 to 6 weeks long and assigns a set of employees. He creates a forecast to reflect the work load expected for the period, and sets desired service level goals. The scheduler will work to create a set of shift assignments to meet these forecasted values and goals, with the added constraint of trying to meet the time bank weekly values within this scheduling period. (Note: The shift assignments hours for each employee will have a hard constraint of the minimum and maximum working hours permitted for this employee.) The scheduler is also aware of any overage or underage of the shift assignment hours to date, and will try to catch up or subtract to bring the time bank total closer to the expected total for the end of the scheduling period.

Scheduler Warnings: If, after scheduling the employee is over or under his hours for the current period of for the bank to date, the following message will be shown in both the scheduler warning tree and the "!" conflicts:

Employee X is over/under scheduled for Y hours for his Time Bank Z hours of A from mm/dd/yyyy to mm/dd/yyyy.

If the time bank period for an employee does not fully intersect the scheduling period that is being scheduled, a pre-scheduler warning will be shown identical to the warning when an assignment rule period does not correspond to the scheduling period.

Scheduling Hour Adjustments: Time banks are general and will be applied to a group of employees. There may be scenarios where adjustments need to be made for specific employees, for example a new employee starting mid-time bank, or an employee needing to take weeks of unpaid leave. In these situations, the user will go to the campaign, select the individual employee and request a specific number of hours be added or subtracted to the employee's time bank on that specific date. If the employee had to take 3 weeks of unpaid leave where he was expected to work a total of 200 hours, the adjustment would be added to the first week after the 3 weeks of unpaid leave. If the employee was new and starting half way through the year, the user may want to put an adjustment at his start date to account for the hours expected for the months prior to his hiring or transfer. We intentionally do not do this automatically for new hires to allow the company to determine how it wants to handle this scenario. The significance of this feature is two parts. Part 1 means the scheduler isn't going to be playing catch up with hours for the remainder of the time bank period. Part 2 is that the tracking of the time bank hours against the plan will reflect more accurately what the expectation for hours is specifically for this employee.

F&S Tracking of Employee Time Bank hours to assigned hours: The user will be able to view the target hours, assigned paid hours, and the current balance from the employee page. By selecting the employee and the time bank tab, these values will be displayed for the base periods, intermediate period, and time banks for all scheduled weeks. Green and red cells will be used to reflect balances in the positive (green) or negative (red), for an easy overview understanding of the status of the time bank plan. When a shift assignment spans across a base period boundary, the whole shift length will be counted towards that base period if its start date is in the base period; otherwise, it will not be included at all for this base period.

Web Interface for Tracking Employees: Agents and managers will be able to view and track the employee's current time bank information through the web interface. The agent and manager web views show different over/under hours then the F&S view. Specifically, F&S shows over/under hours relative to the plan while the web pages show over/under hours relative to the pro-rated yearly/period total. For example, let's say the time bank target is 2000 hours a year and the weekly targets say that he has an intermediate goal of 1100 hours for the first half of the year. So far, he is scheduled perfectly to his plan, so F&S would show that he is working 1100 out of 1100 hours (0 over/under). Now, in the web, we would use 1000 hours as the goal, so the agents and managers would see that he is working 1100 out of 1000 hours (100 hours over). This is important because the individual employee doesn't care that he is tracking to the plan, he just cares that he has 100 hours "in the bank" that he will be scheduled off for before the end of the year.

The following data will be shown:

Period: Start Date and End Date of the agent's current time bank template.

Target Hours: The total number of hours required to be worked by this agent in the entire time bank period.

Target Hours (up to date): The pro-rated number of hours required to be worked by this agent in the period from the beginning of the time bank, to the "up to date", which is the end of the last fully-published schedule period which starts within the time bank period. The "up to date" will be shown in parentheses in the title of the time bank section. The way we determine the pro-rated target hours is as follows:

tbStartDate=Time Bank start date.

tbEndDate=Time Bank end date.

upToDate=The end of the last fully-published schedule period which starts within the time bank period.

tbDuration=The number of milliseconds between tbStartDate and tbEndDate.

prDuration=The number of milliseconds between tbStartDate and upToDate.

ratio=prDuration/tbDuration

Target Hours up to date=Target Hours*ratio

Scheduled Hours (up to date): The number of scheduled hours for this agent in the period from the beginning of the time bank, to the "up to date", which is the end of the last fully-published schedule period which starts within the time bank period.

Adjustments: Any schedule adjustments for this agent between tbStartDate and upToDate Balance: (Scheduled Hours up to date+Adjustments)−Target Hours up to date If the agent is currently assigned a time bank, then he/she will see these fields on the Agent's Summary screen. In an example, the agent's current time bank is defined from Jan. 1, 2009 to Jan. 1, 2010, and it has a target of 1000 hours and 0 minutes. The agent's last published schedule period ends on Apr. 17, 2009, so the other columns in the table only go up to this date. The "Target Hours (up to Apr. 17, 2009)" column is the pro-rated target from Jan. 1, 2009 to Apr. 17, 2009. The "Scheduled Hours (up to Apr. 17, 2009)" column is the number of scheduled hours from Jan. 1, 2009 to Apr. 17, 2009. The "Adjusted Hours" column is the sum of the scheduled hours and any adjustments made that are applied to base periods between Jan. 1, 2009 to Apr. 17, 2009. The "Balance" column is the pro-rated target hours minus the adjusted hours. All values are displayed in the HOURS: MINUTES format.

Managers will see time bank data on the employee time summary page. For each agent, the time bank table will appear if the agent is currently assigned to a time bank. Each row in the time bank table will contain the current time bank data for a particular agent. There are two differences between the agent's time bank summary table and the manager's time bank summary table.

Time Bank Name column: The manager will see the current time bank name in a new column.

Editable Adjustments: The manager's "Adjustments" column will contain an icon which brings up the "Adjustments" dialog for that employee, where the manager can add/edit schedule adjustments for that employee, just like in the F&S.

The manager will also have the ability to import a set of adjustment specifying employee, date of adjustment, and the adjustment value.

Filtering for Time Bank Balance: The web client will be able to filter their employee displays by a range of time bank balances. This will allow the manager to easily see how many employees he may have that may have time bank balance concerns.

Web Client Time Bank Report: The "Staffing Reports" topic has a report called "Employee Time Banks" The report is similar to the manager's time bank screen in the web interface described above, however, the report will show both scheduled and actual hours. Also, the report output will contain one section per employee, and each section will contain a row for each of the employee's time banks which fall in the specified date range. An employee's time bank rows will be sorted by time bank start date. Finally, the employee sections will be sorted by employee name.

Report Input Parameters:
  Date Range: This date-time range is used in determining which time bank(s) the employee is/was/will be assigned to at that date. The user can either input the dates himself, or select the Last N Days option (just like most other reports).
  Employee filter: You can report on one or many employees.
  Schedule Range: This is a radio button with two possible values—"To Date" and "Bank Period". If the user selects "To Date", then the Schedule columns will only include scheduled hours up to the current time, making it easier to compare to the Actual columns. If the user selects "Bank Period", then the Schedule columns will include all scheduled hours for the entire time bank period.

Report Output:
  Employee Name: The name of the employee.
  Time Bank Name: The name of the employee's time bank.
  Period: The start/end dates of the employee's time bank.
  Target hours: The total number of hours required to be worked by this agent in the entire time bank period.
  Scheduled Hours: The scheduled hours from the beginning of the bank period to either now ("To Date") or the end of the bank period ("Bank Period").
  Adjusted Scheduled Hours: (Scheduled Hours+Adjustments). Note: Depending on the schedule range parameter (see above) the adjustments will either count those adjustments up to now ("To Date") or all adjustments for the bank period ("Bank Period").
  Schedule Balance: Target Hours—Adjusted Scheduled Hours
  Actual Hours To Date: The number of hours actually worked by agent in the bank period.
  Adjusted Actual Hours To Date: (Actual Hours To Date+Adjustments)
  Actual Balance: Target Hours—Adjusted Actual Hours To Date The automated time banking solution provides an innovative workflow and user interface for planning, managing and tracking to target work hour values that span multiple weeks and months.

This invention is a fully integrated time banking integration. Users will be able to create their time bank plan using optimization algorithms based on all employee factors, from work hours, new hires, attrition, as well as forecasted incoming volume. It provides extensive tools to modify or reuse the time bank plan. It incorporates the time bank constraints into an advanced scheduling system that takes into consideration not only the time bank plan, but also any manual adjustments made during the time bank period, and automatic adjustments for current underage or overage of an employee's time bank hours. And, finally it provides integrated user displays and reports that allow the agent or manager to monitor the time bank balance and make adjustments. This invention is not a side report or spreadsheet of some forecasting software, it is a fully integrated key component of the whole WFO (work force optimization) solution.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for automated time banking:
creating a time bank for a workforce including a plurality of workers within an organization in a memory device;
assigning the time bank to the plurality of workers;
determining base hours, vacation hours, and hours worked for the plurality of workers;
processing the base hours, vacation hours, and hours worked in a computer to determine time bank hours for the plurality of workers;
importing a time bank plan including hours worked, expected hiring, expected attrition, expected incoming work volume for the organization, and shift assignment constraints;
processing the time bank plan to determine goal hours for the organization and for the plurality of workers, and to determine expected time bank totals for the organization and for the plurality of workers;
storing the time bank hours in the time bank in the memory device;
processing the time bank and the goal hours in the computer to determine a work schedule for the workforce by scheduling the plurality of workers in a manner which optimizes time bank totals for the schedule with respect to the expected time bank totals and the goal hours while meeting the shift assignment constraints; and
storing the work schedule in the memory device.

2. The method of claim 1, further comprising:
receiving an adjustment to the time bank hours; and
updating the time bank based at least in part on the adjustment to the time bank hours.

3. The method of claim 1, further comprising:
tracking actual worked hours for the employee; and
adjusting the time bank based at least in part on the actual worked hours.

4. The method of claim 1,
wherein the shift assignment constraints include minimum work hours, maximum work hours, and overtime hours.

5. A system for automated time banking comprising:
a memory configured to store a time bank, and a work schedule; and
a processor coupled to the memory configured to:
  create a time bank for a workforce including a plurality of workers within an organization;
  store the time bank in the memory;
  assign the time bank to the plurality of workers;
  determine base hours, vacation hours, and hours worked for the plurality of workers;

process the base hours, vacation hours, and hours worked to determine time bank hours for the plurality of workers;

import a time bank plan including hours worked, expected hiring, expected attrition, expected incoming work volume for the organization, and shift assignment constraints;

process the time bank plan to determine goal hours for the organization and for the plurality of workers, and to determine expected time bank totals for the organization and for the plurality of workers;

store the time bank hours in the time bank in the memory;

process the time bank and the goal hours to determine a work schedule for the workforce by scheduling the plurality of workers in a manner which optimizes time bank totals for the schedule with respect to the expected time bank totals and the goal hours while meeting the shift assignment constraints; and store the work schedule in the memory.

6. The system of claim 5, wherein the processor is further configured to:
receive an adjustment to the time bank hours; and
update the time bank based at least in part on the adjustment to the time bank hours.

7. The system of claim 5, wherein the processor is further configured to:
track actual worked hours for the employee; and
adjust the time bank based at least in part on the actual worked hours.

8. The system of claim 5,
wherein the shift assignment constraints include minimum work hours, maximum work hours, and overtime hours.

9. A non-transitory computer-readable medium having instructions stored thereon for operating a computer system, wherein the instructions, when executed by the computer system, direct the computer system to:

create a time bank for a workforce including a plurality of workers within an organization;

store the time bank in a memory;

assign the time bank to the plurality of workers;

determine base hours, vacation hours, and hours worked for the plurality of workers;

process the base hours, vacation hours, and hours worked to determine time bank hours for the plurality of workers;

import a time bank plan including hours worked, expected hiring, expected attrition, expected incoming work volume for the organization, and shift assignment constraints;

process the time bank plan to determine goal hours for the organization and for the plurality of workers, and to determine expected time bank totals for the organization and for the plurality of workers;

store the time bank hours in the time bank in the memory;

process the time bank and the goal hours to determine a work schedule for the workforce by scheduling the plurality of workers in a manner which optimizes time bank totals for the schedule with respect to the expected time bank totals and the goal hours while meeting the shift assignment constraints; and store the work schedule in the memory.

10. The non-transitory computer-readable medium of claim 9, wherein the instructions further direct the computer system to:
receive an adjustment to the time bank hours; and
update the time bank based at least in part on the adjustment to the time bank hours.

11. The non-transitory computer-readable medium of claim 9, wherein the instructions further direct the computer system to:
track actual worked hours for the employee; and
adjust the time bank based at least in part on the actual worked hours.

* * * * *